July 28, 1931.    S. A. CRONE    1,816,639
SAFETY SUPPORT FOR BRAKE RODS
Filed May 14, 1930
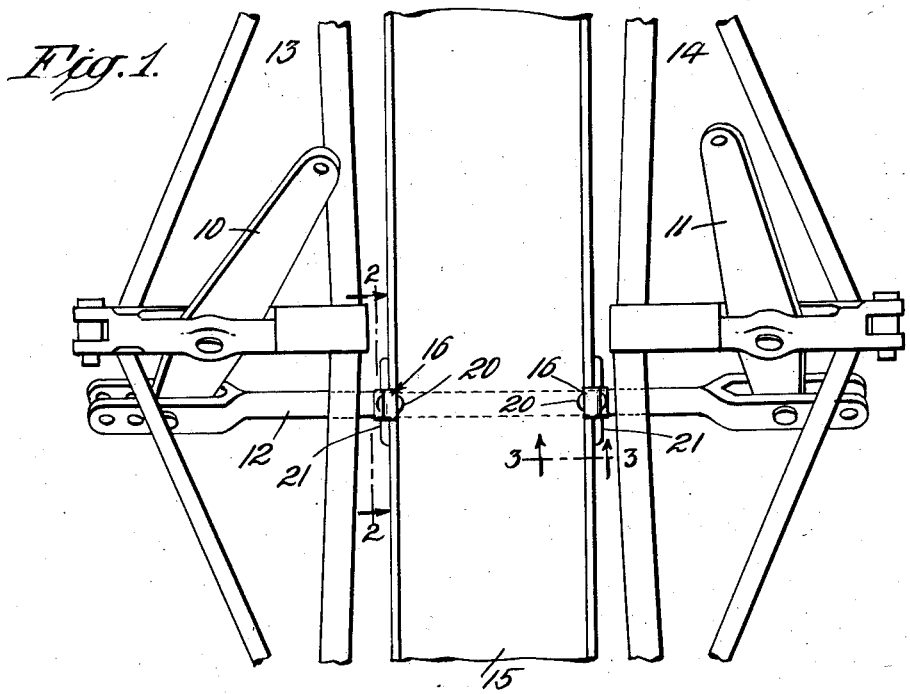
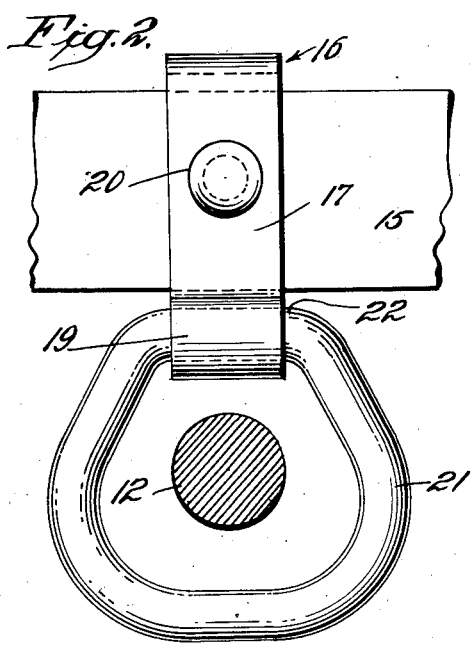
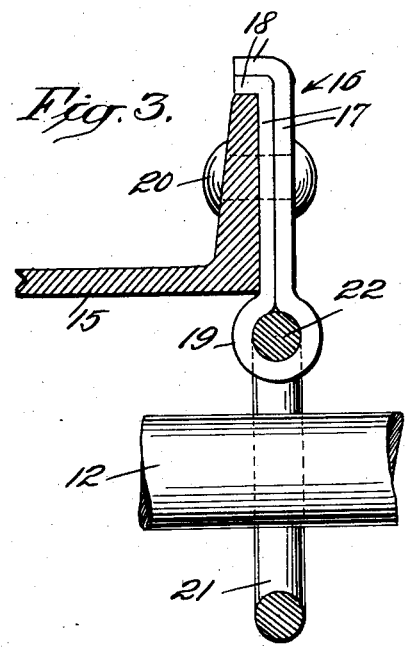
INVENTOR
SETH A. CRONE
BY
Geo. L. Wheelock
ATTORNEY Patented July 28, 1931

1,816,639

UNITED STATES PATENT OFFICE

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK

SAFETY SUPPORT FOR BRAKE RODS

Application filed May 14, 1930. Serial No. 452,228.

This invention relates to safety supports for brake rods, that is to say supports for the bottom rod which connects the two brake levers in the brake mechanism of a car truck, in the event that a pivot or some part connecting the bottom rod with either brake beam may happen to break. Such an accident permits the said rod or the rod and one of the levers to fall upon the track, not only tending to cause a serious accident to the train, but tending to injure the brake mechanism or other parts so as to be difficult of repair. This invention comes into play in such emergency.

A most important object of the present invention is to provide means for supporting a movable rod supporting member, as, for example, a loop or stirrup, from a main support which may be the spring plank or truck channel, or a brake beam, so that the rod supporting loop or the like shall be held against movement, vibration or rattling under normal conditions, but which rod supporting member will be permitted to swing fore or aft in case it strikes an obstruction, such, for example, as a pile of coal or ballast, which projects between the rails of the track. To this end the rod support, such as a loop or stirrup, may be hung from a pivotal connection and will not break if it strikes an obstruction, thereby overcoming the objections which many railways have to bottom rod supports on account of their being rigid and breaking, or bending sufficiently to bind the rod and render the brake ineffective.

In the practice of the present invention it is preferred to hang the yieldable rod supporting member under a suitable friction such as to prevent it from moving out of position under normal conditions, that is when no obstruction strikes it, but which supporting member is preferably of such a yielding nature that the friction which holds it normal is overcome and the rod supporting member will swing under the impact caused by striking an obstruction, thereby tending to preserve the parts of the involved mechanism instead of destroying or damaging them, so that the present invention constitutes an emergency device.

Other objects of the invention are to provide a safety support for the bottom connecting rods of brake levers, and which support shall be simple in construction and comparatively inexpensive considering the function the device is to perform, and which is economical in service.

These being among the objects of the present invention, the same consists of certain features of construction and combinations of parts to be hereinafter described and then claimed with reference to the accompanying drawings illustrating a preferred embodiment of the invention, in which:

Figure 1 is a plan of such parts of the brake mechanism of a railway car as is sufficient to illustrate the present invention, the improvements being shown as applied to a spring plank, for example:

Fig. 2 is an enlarged section transversely of the bottom connecting rod on the line 2—2, Fig. 1, showing the improvements in elevation, and Fig. 3 is an enlarged detail section on the line 3—3, Fig. 1.

Referring to Fig. 1, the brake levers 10, 11 constitute the live and dead levers of the brake mechanism and the lower ends are connected together by the bottom connecting rod 12 which is located below the brake beams 13, 14, parts only of which are shown. The spring plank 15 of the car truck is disposed in the usual manner between the brake beams, and in the preferred embodiment of the said invention the improvements are adapted to the spring plank, although in the basic aspect of the invention the improvements may be applied, for example, to the compression members of the brake beams.

In carrying out the objects of the present invention as adapted to a spring plank or truck channel, suitable attaching brackets 16 are provided adapted for securement to the opposite sides of the spring plank, and these brackets are preferably formed from suitable strip metal bent into such form that they will furnish the necessary supporting strength. See Figs. 2 and 3. The strip 16 is doubled upon itself so as to form flat portions 17 which extend substantially the length of the bracket and the upper ends of which are terminated by lugs 18, formed by bending the terminals at right angles to the flat portions 17, so that they may overlie and engage with the upper edge of one of the flanges of the spring plank 15. Intermediately of the length of the strip of metal which forms the bracket, the same is formed with a cylindrical portion 19 adapted to form a bearing.

When the lugs 18 are engaged over the flange of the spring plank and the bracket set in the proper position above the connecting rod 12, a fastening device, preferably a rivet 20, is passed through the flange and the flat portions 17 of the bracket, and the ends of the rivet upset, so that thereby the bracket 16 is rigidly secured in the required position, but preferably the cylindrical bearing portion 19 is disposed just below the adjacent corner of the spring plank, so as to support a loop or stirrup 20 constituting the rod supporting member in proper position for the bottom rod 12 to pass through it. That portion of the loop or stirrup 21 which is journaled in the cylindrical bearing portion 19, is straight, so as to provide a straight portion 22. In applying the improvement in the required position, the loop or stirrup 21 is first passed over the rod 12 and then the bracket 16 is rigidly fixed in the required position.

It will be seen that the loop or stirrup 21 is sufficiently large so as to provide the required clearance between the bottom rod 12 and the inner edge of the loop, such clearance being allowed because of the oscillating movements required of the bottom rod when the brake mechanism is being operated. When friction is resorted to for the purpose of maintaining the loop or stirrup 21 in normally depending position, the fit of the loop portion 22 in the bearing 19 is a snug one, so snug in fact that under normal conditions the loop or stirrup will remain plumb and not cause any objectionable vibration or rattle. However, due to the fact that the loop or stirrup 21 has a pivotal connection with the bracket 16, such friction will be overcome in the case of an emergency, as where a pile of coal or ballast between the rails might happen to strike the loop or stirrup, in which case it will be caused to swing or yield, and hence the improved bottom rod support will not be damaged or broken by the impact.

If perchance the bottom rod 12 should hit the loop or stirrup during its brake operating movements the strain, if any, on the pivot connection will be directly taken by the flange of the spring plank, because the pivot connection, rivet 20 and lugs 18 are intersected by the vertical plane of the side surface of the spring plank. This is also the case in the event that the rod supporting loop or stirrup should be deflected by striking an obstruction and should be thereby forced against the bottom rod 12 or should the bottom rod drop onto the loop from accidental causes.

It is obvious that the invention may be modified in various ways without departing from the scope of the appended claims.

What I claim as new is:

1. In a safety support for brake rods, the combination of a main support, a supporting bracket thereon, extending on the outside thereof, and having a bearing at its lower end, and a swingable rod supporting member mounted on and suspended from the bearing for movement below the main support.

2. In a safety support for brake rods, the combination of a main support, a supporting bracket thereon, extending on the outside thereof, and having a bearing at its lower end, and a swingable rod supporting loop mounted on and suspended from the bearing for movement below the main support, the loop being closed to surround the rod.

3. In a safety support for brake rods, the combination of a supporting bracket provided with means for securing it to a main support, a bearing portion on the bracket, and a swingable rod supporting loop mounted on the bearing, the loop being closed to surround the rod and the opening through the loop facing in a direction substantially at right angles to the length of the bearing.

4. In a safety support for brake rods, the combination of a suporting bracket provided with means for securing it to a main support, and a rod supporting loop swingably mounted on the bracket, and its opening facing in the direction in which the loop is swingable.

5. In a safety support for brake rods, the combination of a main support, a supporting bracket fixed thereto and having a bearing at its lower end, below the main support, a bottom connecting rod for the brake levers extending below the bearing and in the direction of travel of the car, and a swingable rod supporting loop mounted on the bearing and extending crosswise of and surrounding the connecting rod.

6. In a safety support for brake rods, the combination with the spring plank of a car truck, a supporting bracket rigidly fixed to the spring plank and having a bearing outside the spring plank which extends parallel with the spring plank, and a rod supporting loop mounted on the bearing in a position free of the spring plank for a movement transversely of the spring plank.

7. In a safety support for brake rods, the combination with the spring plank of a car truck, a supporting bracket rigidly fixed to the spring plank and having a bearing which extends parallel with the spring plank, the bracket having lugs overlying the flange of the spring plank, and a rod supporting loop mounted on the bearing for a movement transversely of the spring plank.

8. In a safety support for brake rods, the combination with the spring plank of a car truck, a supporting bracket riveted to an outer side of the spring plank and having a bearing located close to the outer bottom surface of the spring plank and which extends parallel with the spring plank, and a rod supporting loop mounted on the bearing for a movement transversely of the spring plank.

9. In a safety support for brake rods, the combination of the spring plank of a car truck, a strip of bent up metal formed with a cylindrical portion and with end portions secured rigidly to the spring plank in such position as to dispose the cylindrical portion below the spring plank in a position parallel therewith and to furnish a cylindrical bearing, and a swingable rod supporting loop journaled in the bearing for a swingable movement.

10. In a safety support for brake rods, the combination of the spring plank of a car truck, a strip of bent up metal formed with a cylindrical portion and with end portions secured rigidly to the spring plank in such position as to dispose the cylindrical portion below the spring plank in a position parallel therewith and to furnish a cylindrical bearing, the upper terminals of the end portions being bent over the adjacent flange of the spring plank, and a swingable rod supporting loop having a straight portion journaled in the bearing for a swingable movement.

11. In a safety support for brake rods, the combination of attachment means for securing the safety support to a main support, a swingable rod supporting member, and means for establishing a frictional pivot connection between the attachment means and swingable member such that the member is held by considerable friction against movement, vibration or rattling under normal conditions and may yield to a positive impact against it and swing in the case of emergency.

12. In a safety support for brake rods, the combination of attachment means for securing the safety support to a main support, a swingable rod supporting loop, and means for establishing a frictional pivot connection between the attachment means and swingable loop such that the loop is held by considerable friction against movement, vibration or rattling under normal conditions and may yield to a positive impact against it and swing in the case of emergency.

13. In a safety support for brake rods, the combination of a main support, and a rod supporting member pivotally mounted on and below the support, the pivot connection, including a provision for stabilizing the member under normal conditions and for allowing the member to yield and swing when subjected to abnormal positive pressure.

SETH A. CRONE.